3,227,670
ADHESIVE COMPOSITIONS CONTAINING ACETAL RESIN AND EXHIBITING IMPROVED AGING RESISTANCE
John Francis Regan, Wilmington, Del., assignor to E. I. du Pont de Nemours and Company, Wilmington, Del., a corporation of Delaware
No Drawing. Filed Jan. 24, 1962, Ser. No. 168,876
6 Claims. (Cl. 260—29.2)

This invention relates to novel adhesive compositions for joining articles of organic resins.

In a copending application of William J. Middleton, United States Serial No. 107,302, filed May 3, 1961, and now abandoned, it was disclosed that certain polyhalogenated alcohols were excellent solvents for acetal resins. Among the many applications of this valuable discovery was the use of such solutions as adhesives for joining resinous articles, particularly articles of acetal resin.

It has since been discovered that although joints of extraordinary strength are obtained initially by the use of such solutions as adhesives, upon aging, and more particularly upon aging at higher temperatures, a relatively rapid deterioration of strength takes place. This deterioration, moreover, occurs even with solutions which have been viscosity stabilized by the addition of tertiary amines as disclosed by Middleton.

Accordingly, it is an object of the present invention to provide adhesive compositions which are stable, and which provide joints having improved resistance to deterioration on aging.

Other objects will become apparent hereinafter.

The objects are achieved by providing a homogeneous adhesive composition having as its essential ingredients: a solvent consisting of a polyhaloketone in which the halogen atoms are chlorine or fluorine having from 3 to 7 carbon atoms in the molecule and being hydrated with from 1 to 2 moles of water by the addition of an inorganic aqueous buffer solution having a pH in the range between 6 and 10, containing as a solute up to 20% w./v. of an acetal resin and containing a stabilizing amount of a soluble antioxidant effective for the stabilization of acetal resins.

The polymers with which this invention is concerned are the synthetic, high molecular weight, linear acetal resins (this term including the polyketals), wherein the acetal oxygens are intralinear, i.e. integral members of the linear polymeric chain or "backbone," and are in open-chain configuration, i.e. not members of a cyclic structure. These polymers are characterized by the presence of repeating units containing the acetal linkage,

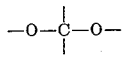

the free valences of the acetal oxygen being attached to carbon atoms of the polymer chain. Polymers of this type are well known in the art and require no further description.

The term "polymers" as used herein includes copolymers containing acetal units of two or more different types, and copolymers containing units other than acetal units, with the proviso, however, that in such copolymers at least two-thirds of the repeating units present are acetal units, in order that the copolymer possess the requisite characteristics of solubility in, and compatibility with, the polyhaloalcohols which constitute the other essential ingredient in the compositions of this invention. Otherwise expressed, the copolymer should contain at least two-thirds, on a molar basis, of the acetal-containing repeating unit or "mer."

Many synthetic acetals of the type defined above have been described in the chemical literature. Among these may be mentioned in the first place the polyoxymethylenes, e.g. the formaldehyde polymers, and most importantly those described in U.S. Patent 2,768,994, issued on October 30, 1956, to R. N. MacDonald. The latter are distinguished from previously known polyoxymethylenes by either or both of two features, namely, by having a first order reaction rate constant for thermal degradation at 222° C. of less than 1% per minute, and/or by having a degree of toughness of at least 1. These polyoxymethylenes can be further improved with respect to thermal stability by acylation of the terminal hydroxyl groups, as described in U.S. Patent 2,964,500, issued to S. H. Jenkins et al. on December 13, 1960, and U.S. Patent 2,998,409, issued to S. Dal Nogare et al. on August 29, 1961. The examples which follow illustrate the use of polyoxymethylenes of this type in the compositions of this invention. Other polymers that come into consideration are the superpolyacetals and superpolyketals of U.S. Patent 2,071,252, issued to W. H. Carothers on February 16, 1937, for example, polyhexamethylene formal, polydecamethylene formal, polyhexamethylene isobutyral or polyhexamethylene ketal. Suitable copolymers containing acetal linkages include, for example, the formaldehyde fluoroaldehyde copolymers of U.S. Patent 2,828,287, issued to Theodore Le Sueur Cairns on March 25, 1958, e.g. the copolymers of formaldehyde with trifluoroacetaldehyde or heptafluorobutyraldehyde. Other suitable acetal copolymers are the block copolymers prepared by continuously introducing pure monomeric formaldehyde into a hydrocarbon reaction medium containing, in solution, a preformed polymeric substance having active hydrogen atoms as determined by the Zerewitinoff method, and a formaldehyde polymerization initiator. In this manner there are produced block copolymers of formaldehyde with active hydrogen-containing polymers such as polyalkylene glycols (e.g., polyethylene glycol, polytetramethylene glycol), amino polymers such as methyl methacrylate/vinyloxyethylamine copolymers or hydrogenated butadiene/acrylonitrile copolymers, or polythiols such as polybutylenethiols.

Other ether acetal copolymers are those prepared from formaldehyde or trioxane as one comonomer, and vinyl ethers, isobutylene, vinyl amides, isocyanic acid, ethylene oxide, and the like as another comonomer.

The ketones which may be employed in the practice of this invention are polyhaloketones having 3 to 7 carbon atoms, which may be generally represented by the formula,

in which $R_1$ and $R_2$ are aliphatic radicals substituted with fluorine atoms or chlorine atoms or both. Preferably, at least two fluorine atoms should be substituted in the alpha position to the ketonic group.

These ketones may be exemplified by

Hexafluoroacetone
$CF_3COCF_3$

Sym-dichlorotetrafluoroacetone
$CF_2ClCOCF_2Cl$

Trifluoromethyl, trichloromethyl ketone
$CF_3COCCl_3$

Omega-hydroperfluoropenta-2-one
$CF_2H(CF_2)_2COCF_3$

Decafluoropenta-3-one
$CF_3CF_2COCF_2CF_3$

Tetradecafluoropenta-4-one
$CF_3(CF_2)_2CO(CF_2)_2CF_3$

Tetradecafluoro(2,4-dimethyl penta-3-one)

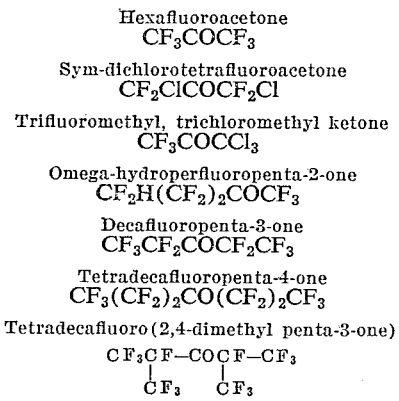

and the like.

The ketones described hereinabove form a series of hydrates with water, which generally exist in equilibrium with one another. The preferred compositions of this invention contain from 1 to 2 moles of water per mole of ketone, but other proportions of water are operable in some instances. For example, sym-dichlorotetrafluoroacetone trihydrate is an excellent solvent for acetal resins at room temperature, and may be employed in the adhesive compositions. However, the accelerated aging tests indicate that compositions containing from about 1 to about 2 moles of water per mole of ketone are superior for making adhesives with long term, joint-strength properties. In certain cases, the lower hydrates are crystalline solids of low melting point. While such compounds may be used as solvents for acetal resins above the melting point, it is generally desirable to employ sufficient water to ensure that the solution is liquid at room temperature and thus provide an adhesive which may be used at room temperature and stored for many months on a shelf at room temperature.

The reaction of the fluorinated ketones with water is strongly exothermic, and care should be taken in mixing the selected ketone with water to provide adequate stirring or other means of agitation, and cooling, in order to remove the heat of the reaction.

The buffering components of the adhesive composition are preferably added to the water used to hydrate the ketone. In general, buffer solutions containing only inorganic salts and which have a pH in the range between about 6 and 10 should be employed as the hydrating medium.

Many examples of such buffer solutions are known in the art. In particular, compositions containing the buffer pairs, potassium dihydrogen phosphate-disodium hydrogen phosphate, potassium dihydrogen phosphate-sodium hydroxide, boric acid-borax, and boric acid-sodium hydroxide, in proportion to give a pH in the range between 6 and 10 may be mentioned. Mixtures of simple buffer systems having the appropriate pH may likewise be employed.

The antioxidants which may be used in the compositions of this invention are those antioxidants which are effective for the stabilization of acetal resins, and which are soluble in the ketone hydrate solvents described hereinabove. The preferred antioxidants are of the phenolic or bisphenolic types described in U.S. Patents 2,871,220, issued to R. N. MacDonald on January 27, 1959, and U.S. 2,966,476, issued to R. D. Kralovec et al. on December 27, 1960, respectively.

A stabilizing amount of the antioxidant should be employed which is generally in the range between about 0.001% and 2% w./v. in the solution.

The buffered fluoroalcohol solvents with antioxidant form operable adhesive compositions when employed to unite two articles at least one of which is an acetal resin, the solution of the acetal resin being formed in situ. While the use of the solvent without prior addition of acetal resin is specifically embraced in the scope of this invention, it is not preferred.

The proportion of acetal resin which would be employed in the solution is relatively critical. Optimum joint strength is obtained with compositions containing about 5% w./v. of the acetal resin in the solvent. The optimum strength is about three times the strength obtained by the use of solvent alone to form the joint. Concentrations of from 1% to 20% w./v. of acetal resin in the adhesive composition yield joints which are at least about twice as strong as those formed by the use of solvent alone to form the joint.

The adhesive solutions containing ketone hydrate solvent, acetal resin, buffering salts and antioxidant are homogeneous, transparent, generally colorless, viscous solutions, stable for many months at room temperature.

It will be realized that many other additives may be included in these compositions, notably fillers, reinforcing agents, ultraviolet screens, pigments, dyes, and the like. Other solvents for acetal resins may likewise be added. It has been found for example that the lower polyhalofluoroalcohols, having at least two fluorine atoms in the alpha position to the carbon atom containing the hydroxy group, may be added in amounts up to 90% or more of the composition, to provide adhesive compositions which retain some aging benefits. In general, however, it is desirable that at least 50% by volume of the adhesive composition should consist of the essential ingredients defined hereinabove.

The adhesive compositions of this invention are particularly suited to the formation of joints between articles of acetal resins. The preferred method of making such joints is to spread the adhesive composition in a thin layer, using a brush or spatula according to the viscosity of the adhesive, over the surfaces to be glued, allowing the surfaces to stand for about 15 minutes, then lightly clamping the surfaces together with adhesive tape, rubber bands, conventional clamps, or the like. Excessive clamping pressure which tends to expel the adhesive rapidly from the region of the joint is undesirable.

The adhesive compositions of this invention may also be employed to unite articles made of other thermoplastic resins having polar groups capable of hydrogen bonding. Examples of such resins are the polyamides such as polyhexamethylene adipamide, polyhexamethylene sebacamide, polycaprolactam, polyesters such as polyethylene terephthalate, polyvinyl alcohol, polyvinylacetate, cellulose acetate, cellulose nitrate, cellulose butyrate, polyvinyl butyral, polymethyl methacrylate, polymethacrylic acid, polyacrylonitrile, polyimides, polycarbonates, and the like, including copolymers and blends in which the aforesaid hydrogen bondable polymeric units form a substantial part of the composition. Joints between different compositions may be formed, provided that each of the polymeric resin contains hydrogen-bondable groups. Thus, an article of acetal resin may be bonded to an article of a polyamide. Many constructions are therefore possible by the use of the adhesive compositions which would have been difficult or impossible to form by other methods.

The invention is further illustrated by the following examples, which are, however, intend by way of illustration only, and should not be construed as limiting the scope of this discovery.

EXAMPLES I TO V

In the following examples, I to V, adhesive solutions of a high molecular weight, thermally stable polyoxymethylene diacetate resin in sym dischlorotetrafluoro acetone hydrated with various amounts of buffer solution were made up according to the following procedure:

Commercial sym dichlorotetrafluoroacetone was purified by passing it through a bed of calcium sulfate, taking precautions to exclude atmospheric water. A pH 7 buffer solution containing inorganic salts was made up from 29.63 cc. of 0.1 N NaOH solution and 50 cc. of 1 M $KH_2PO_4$ diluted to 100 cc. with water.

Lots of the sym dichlorotetrafluoroacetone weighing 20 grams (0.1 mol) were placed in crew-cap jars and cooled in ice water solution. The calculated quantities of the buffer solution, by volume, were added slowly from a burette with vigorous stirring in order to dissipate the heat of the strongly exothermic reaction. To these jars was then added 0.5 gram of a high molecular weight thermally stable acetal resin and 0.01 gram of dixylenol butane antioxidant for each 10 cc. of the buffered solvent. The jars were capped tightly and solution effected by shaking for one hour at a temperature of about 60 to 70° C. The adhesive so prepared is then ready for immediate use.

The adhesive properties of these solutions were tested by gluing together sets of three molded bars of a high molecular weight acetal resin ½" x ¼" x 5", having a good surface to surface fit, to form a tuning fork structure with a double lap joint. The surfaces to be joined were cleaned, but otherwise were not chemically or physically treated, were then painted with the adhesion solution using a spatula, allowed to stand for 15 minutes and then the joint formed and clamped with a rubber band. Joints so formed were tested after standing 16 hours at room temperature. The shear strength was tested in an Instron tensile testing machine at room temperature for several such joints made from each adhesive formulation. Other samples were subjected to an accelerated aging test by heating in an oven at 85° C. for a set time, then testing. The results of these tests are summarized in Table I. In that table each result is the mean of at least two tests.

The results clearly demonstrate that joints of optimum strength are obtained with a solution containing about 5% by weight of the acetal resin.

EXAMPLE XI

The adhesive properties of solution of an acetal resin in hexafluoroacetone hydrate were investigated by the following experiment.

Weighed quantities of a pH 7 buffer solution prepared as described hereinabove for Examples I to V were placed in screw-cap bottles which were then cooled in an ice water bath. Hexafluoroacetone vapor was then purified by passing it through a bed of calcium sulfate and bubbled slowly into the well-stirred, cooled solutions. The bottles were removed from time to time, and weighed to determine the amount of hexafluoroacetone added to the buffer solution.

The monohydrate of hexafluoroacetone is a solid, melting point 40° C. and was thus not deemed to be suitable for use as a room temperature solvent for use in an adhesive. The compound $CF_3COCF_3 \cdot 1.5H_2O$ made up with a buffer solution as described hereinabove was used to dissolve 5% w./v. of a high molecular weight thermally stable acetal resin to form an effective adhesive. The adhesive made with hexafluoroacetone hydrated with two moles of water containing buffer salts, in which was dissolved 5% w./v. of an acetal resin, and, as an antioxidant, 0.1% w./v. dixylenolbutane, was found to be a more effective adhesive. The shear strength measured on an Instron tester of a double lap joint made between bars of acetal resin, as described hereinabove for Examples I to V inclusive, was 1100 p.s.i., after 16 hours from making the joint (zero time test). After two

*Table I*

EFFECT OF DEGREE OF HYDRATION ON THE JOINT STRENGTH OF GLUED JOINTS MADE WITH SYM-DICHLOROTETRAFLUOROACETONE-ACETAL RESIN ADHESIVES

| Example | Composition of Solvent | Initial Room Temperature, Shear Strength After 16 Hours, p.s.i. | Shear Strength of Adhesive Band After Aging at 85° C., p.s.i. | | | |
|---|---|---|---|---|---|---|
| | | | 3 hours | 6 hours | 9 hours | 15 hours |
| I | $CF_2ClCO \cdot CF_2Cl \cdot \frac{1}{2}H_2O$ | 1,500 | 1,300 | 1,200 | 1,000 | 950 |
| II | $CF_2ClCOCF_2Cl \cdot H_2O$ | 2,000 | 1,600 | 1,500 | 700 | 950 |
| III | $CF_2ClCOCF_2Cl \cdot 1.5H_2O$ | 2,900 | 1,000 | 800 | 900 | 600 |
| IV | $CF_2ClCOCF_2Cl \cdot 2H_2O$ | 3,700 | 1,100 | 1,000 | 300 | (1) |
| V | $CF_2ClCOCF_2Cl \cdot 3H_2O$ | 3,700 | 900 | 800 | 300 | (1) |

1 Broke.

EXAMPLES VI TO X

In the following examples, Examples VI to X, solutions of a high molecular weight thermally stable acetal resin were prepared in buffered sym dichlorotetrafluoroacetone monohydrate together with antioxidant according to the procedure employed in Examples I to V, except that varying amounts of acetal resin were employed in each solution. The solutions were then tested for adhesive properties by the same procedure as that described for Examples I through V. The results are recorded in Table II.

*Table II*

STRENGTH IN SHEAR OF DOUBLE LAP JOINTS MADE BETWEEN BARS OF ACETAL RESIN WITH AN ADHESIVE COMPRISING DICHLOROTETRAFLUORO ACETONE MONOHYDRATE AND THE STATED PERCENTAGE IN WEIGHT OF ACETAL RESIN PER UNIT VOLUME; STRENGTH MEASURED AFTER 16 HOURS

| Example | Concentration of Acetal Resin | Shear Strength, p.s.i. |
|---|---|---|
| VI | 0 | 1,460 |
| VII | 2 | 2,360 |
| VIII | 5 | 3,400 |
| IX | 10 | 2,560 |
| X | 20 | 2,030 | hours of accelerated aging, at 85° C., the strength was 400 p.s.i. and after seven hours, the strength measured on duplicate samples was again 400 p.s.i.

Acetal resins were found to be insoluble in the trihydrate.

EXAMPLE XII

The adhesive employed in this example was prepared by adding 40.7 grams of decafluoropentane-3-one to 2.7 ml. of the pH 7 buffer solution described hereinabove, and then adding to the resultant hydrated solution 0.5 gram of high molecular weight acetal resin for each 10 cc. of solvent, and 0.01 gram of dixylenol butane antioxidant. The mixture was warmed to about 60° C. and gently agitated for several hours until a clear solution was obtained. The resultant adhesive solution was used to glue a series of double lap joints between three bars of acetal resin in the standard manner described hereinabove. After 48 hours aging at room temperature, tests on four joints gave an average shear strength of 1600 p.s.i.

EXAMPLE XIII

A solution containing 5% w./v. of an acetal resin in sym dichlorotetrafluoroacetone dihydrate containing buffer and antioxidant was prepared as set forth in Examples I to V. A second solution containing 5% w./v. of the same acetal resin in sym dichlorotetrafluoroacetone dihydrate was prepared by adding the calculated quantity of water to the ketone, adding 0.1 cc. of tri-n-propyl amine for each 10 mls. of ketone hydrate solvent and 0.01 gram of dixylenol butane antioxidant, then adding 0.5 gram of the acetal resin in the form of fluff, heating the mixture to about 60° C. and stirring to accelerate the solution. A series of double lap jointed test pieces between bars of acetal resin were made as described in Example I, after setting for 16 hours, the test pieces were placed in an oven and aged at 225° F. (107° C.). Sample test pieces were withdrawn from the oven and tested from time to time. The results of these tests, which are shown in Table III, demonstrate that the strength of joints made with the buffered adhesive composition of this invention retain their strength to a greater degree upon aging than joints made with a similar adhesive composition containing an amine stabilizer.

*Table III*

COMPARISON OF BUFFER-STABILIZED ADHESIVES WITH AMINE STABILIZED ADHESIVES COMPOSITIONS

| A. 5% w./v. acetal resin in $ClCF_2COCF_2Cl \cdot 2H_2O$ + Amine + Antioxidant | | B. 5% w./v. acetal resin in $ClCF_2COCF_2Cl \cdot 2H_2O$, with buffer and antioxidant | |
|---|---|---|---|
| Time of aging at 107° C., Hours | Shear strength of joint, p.s.i. | Time of aging at 107° C., hours | Shear strength of joint, p.s.i. |
| 0 | 2,450 | 0 | 2,600 |
| 24 | 479 | 24 | 1,020 |
| 120 | 740 | 40 | 1,140 |
| 192 | 687 | 64 | 1,125 |
| 238 | 420 | 160 | 767 |
| 360 | 500 | 232 | 963 |
| | | 328 | 890 |
| | | 400 | 1,060 |
| | | 736 | 750 |
| | | 1,500 | 800 |

I claim:
1. An adhesive composition which contains as a major essential component, a mixture consisting of an aliphatic polyhaloketone in which the halogen atoms are selected from the class consisting of fluorine and chlorine, and having at least two fluorine atoms in the alpha position to the keto group, said ketone having from three to seven carbon atoms, an amout of an aqueous inorganic buffer solution having a pH in the range between 6 and 10 sufficient to provide from 1 to 2 moles of water per mole of said ketone, a stabilizing amount of an antioxidant effective to prevent the oxidation of acetal resins and from 1 to 20% w./v. of a high molecular weight linear acetal resin.
2. Composition of claim 1 in which said ketone is sym dichlorotetrafluoroacetone.
3. Composition of claim 2 in which said acetal resin is present in said mixture in a concentration of about 5% w./v.
4. Composition of claim 1 in which the antioxidant is a phenolic antioxidant.
5. Composition of claim 2 in which the antioxidant is a phenolic antioxidant.
6. Composition of claim 3 in which the antioxidant is a phenolic antioxidant.

References Cited by the Examiner
UNITED STATES PATENTS

| 2,559,628 | 7/1951 | Joyce | 260—633 |
| 2,775,570 | 12/1956 | Barkdoll et al. | 260—33.4 |
| 2,824,897 | 2/1958 | Wujciak et al. | 260—633 |
| 2,964,500 | 12/1960 | Jenkins et al. | 260—67 |
| 3,030,409 | 4/1962 | Andreades et al. | 260—488 |

MURRAY TILLMAN, *Primary Examiner.*

L. J. BERCOVITZ, *Examiner.*